(12) United States Patent
Kress et al.

(10) Patent No.: US 7,748,935 B2
(45) Date of Patent: Jul. 6, 2010

(54) BROACHING TOOL AND METHOD FOR MACHINING THE SURFACES OF BORES

(75) Inventors: Dieter Kress, Aalen (DE); Friedrich Häberle, Lauchheim (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 822 days.

(21) Appl. No.: 10/594,536

(22) PCT Filed: Feb. 23, 2005

(86) PCT No.: PCT/EP2005/001860

§ 371 (c)(1),
(2), (4) Date: Sep. 27, 2006

(87) PCT Pub. No.: WO2005/107986

PCT Pub. Date: Nov. 17, 2005

(65) Prior Publication Data

US 2008/0118322 A1    May 22, 2008

(30) Foreign Application Priority Data

Apr. 15, 2004 (EP) .................. 10 2004 019 302

(51) Int. Cl.
    B23D 43/06 (2006.01)
(52) U.S. Cl. .................. 409/260; 409/244; 409/249
(58) Field of Classification Search .................. 409/244, 409/249, 259–261, 287; 407/13, 15–16; B23D 37/04, B23D 37/10, 37/14, 37/16, 43/02, 43/00, B23D 43/06
See application file for complete search history.

(56) References Cited

U.S. PATENT DOCUMENTS

| 1,394,079 A | * | 10/1921 | Fuchs ..................... 409/261 |
| 2,319,451 A | * | 5/1943 | Groene et al. ............... 409/261 |
| 2,354,411 A | * | 7/1944 | Thompson .................. 409/261 |
| 2,502,711 A | * | 4/1950 | Evans ...................... 30/92.5 |
| 2,517,104 A | * | 8/1950 | Gotberg .................... 409/248 |
| 2,530,066 A | * | 11/1950 | Laase ...................... 409/260 |
| 3,221,608 A | * | 12/1965 | Anthony .................... 409/260 |
| 2003/0118418 A1 | | 6/2003 | Kinoshita et al. |

FOREIGN PATENT DOCUMENTS

| CN | 85205795 | | 2/1987 |
| DE | 3920483 | | 1/1991 |
| DE | 10028767 A1 | * | 12/2001 |
| EP | 0 104 694 A | | 4/1984 |

OTHER PUBLICATIONS

Chinese Office Action in the parallel Chinese application CN85205795 with partial translation.

* cited by examiner

*Primary Examiner*—Daniel W Howell
(74) *Attorney, Agent, or Firm*—Harness, Dickey & Pierce, P.L.C.

(57) ABSTRACT

A broaching tool for the machining of bore surfaces, namely for introducing at least one groove, is proposed, the tool having a cutter head (5) with at least one cutter (69) and with a body (3) bearing the cutter head (5). The tool is characterized in that the cutter head (5) is rotatably movable and positioned eccentrically in the body (3), and that the middle axis (65) of the cutter head (5) forms an acute angle α with the middle axis (7) of the body (3).

12 Claims, 1 Drawing Sheet

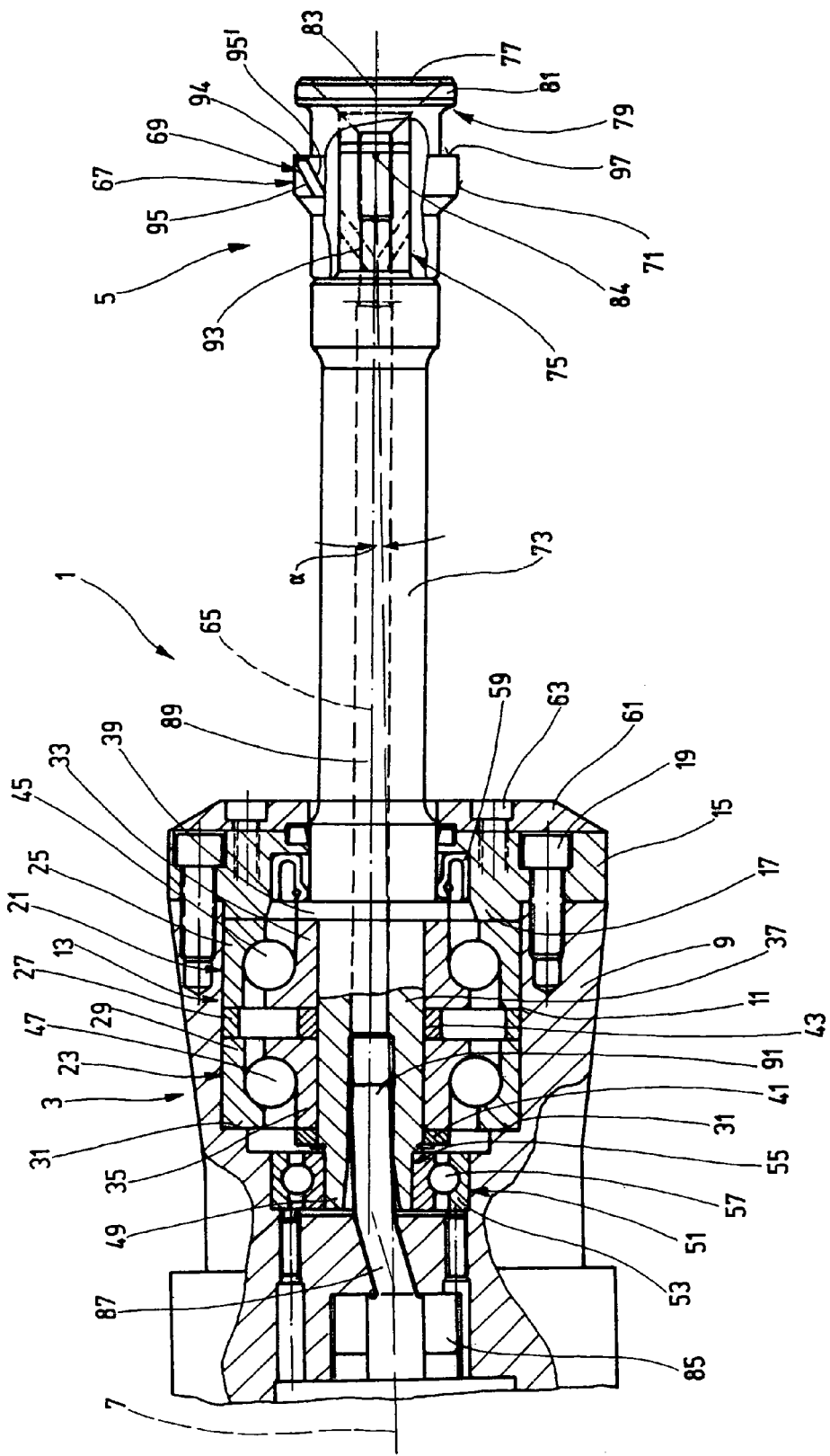

BROACHING TOOL AND METHOD FOR MACHINING THE SURFACES OF BORES

The invention relates to a broaching tool for machining the surfaces of bores, namely for introducing at least one groove, with a cutter head provided with at least one cutter and with a body bearing the cutter head as well as to a method for machining the surfaces of bores in accordance with the preamble of claim 12.

Broaching tools and methods for machining the surfaces of bores are known. They serve to provide the surface of a bore with at least one groove that preferably is twisted, for example by 20°. In other words, the groove extends on an imaginary screw line with an angle of rotation of, for example, 20° measured along the length of the bore that is to be machined. In such machining, known broaching tools also undergo a rocking motion referred to as a tumbling motion that is carried out by a tool spindle supporting the broaching tool. In the performance of the method for machining the surface of a bore, during the tumbling motion the broaching tool is introduced into the bore to be machined in axial direction. When it is necessary to provide a groove with a twist, the tool must be twisted. In many cases, a rotary movement of the tool is not possible or requires a major constructive and financial effort. Moreover, a special tool is required for bringing about the tumbling motion of the broaching tool. This, too, makes the machining of a bore surface considered here expensive and tedious.

It has been proposed to fabricate a broaching tool with a body and a cutter head that is elastically connected therewith. The cutter head is introduced into a bore that is to be machined while the body is moved by a machine tool in a circular path that is concentric with the middle axis of the bore surface to be machined. In other words, it is necessary to move heavy weights which particularly at high rotational speeds causes vibrations. Moreover, for many applications the machining time to provide the bore surface with a defined groove is too long.

Hence, the object of the invention is to provide a broaching tool that can be easily and inexpensively fabricated and which during use does not vibrate to a high degree. Finally, the tool should make it possible to machine the surface of a bore in a short time.

To reach this objective, we propose a broaching tool having the features described in claim 1. It comprises a cutter head and a body. It is characterized by the fact that the cutter head can undergo a rotary motion and is disposed eccentrically in the body and that the middle axis of the cutter head is inclined at an acute angle toward the middle axis of the body.

Other embodiments of the broaching tool are described in the subclaims.

Another object of the invention is to provide a method for the machining of bore surfaces, namely for introducing at least one groove, by which method the machining of a work piece can be accomplished faster than by conventional methods.

To reach this goal, we propose a method characterized by the fact that the body of the broaching tool is made to rotate and relative to the work piece undergoes a movement that is coaxial with the middle axis of the bore surface to be machined. As a rule, the body is subjected to an advancing motion relative to the work piece. It is also conceivable to displace the work piece relative to the stationary body in the axial direction, or to move both elements relative to one another. In this case, the cutter head also carries out an axial movement relative to the bore surface to be machined.

In the following, the invention is described in greater detail by reference to a drawing. The single drawing shows a partial longitudinal sectional view of a broaching tool.

Broaching tool 1 has a body 3 and a cutter head 5 that is eccentrically and rotatably supported in body 3.

Only the part of body 3 that receives the cutter head 5 is shown here. At the end of the body, here broken off, that lies opposite cutter head 5 can be provided, for example, a tool shank that serves to connect body 3 with a machine tool.

It is also possible to connect body 3 with a machine tool by means of an adapter, connectors or the like. The machine tool serves to rotate body 3 during the machining of a bore surface and to provide at least one groove in the bore surface.

In other words, during the machining of a work piece, body 3 rotates about its middle axis 7 which coincides with the middle axis of the bore surface to be machined.

The body is provided with a base element 9 which has a recess 11 into which a bearing arrangement 13 can be inserted. The recess serves to receive cutter head 5 in rotating manner. In other words, the cutter head is disposed rotatably relative to body 3 and its base element 9.

Bearing arrangement 13 absorbs both radial and axial forces. This means that during the machining of a bore surface with a cutter head 5 compressive forces can be exerted onto the head via body 3. Vice-versa, by means of bearing arrangement 13, cutter head 5 absorbs compressive axial forces applied to body 3.

Bearing arrangement 13 is designed so that when body 3 rotates, no torque is transmitted to cutter head 5.

Bearing arrangement 13 is anchored in recess 11 by means of a fixing plate 15. A protruding bearing shoulder 17 slightly engages recess 11 to hold bearing arrangement 13. Fixing plate 15 is anchored to base element 9 by means of appropriate fastening means, for example with screws 19.

In the practical example presented here, bearing arrangement 13 preferably has two angular ball bearings 21 and 23 disposed coaxially to one another. Bearing shoulder 17 rests on an outer ring 25 of first angular ball bearing 21. The ring transmits the compressive forces generated by bearing shoulder 17 via a, preferably annular, spacer element 27 to the outer ring 29 of second angular ball bearing 23 which rests on a bearing step that protrudes into the inner space of recess 11. In other words, angular ball bearings 21 and 23 are fastened by fixing plate 15 between its bearing shoulder 17 and the bearing step.

Angular ball bearings 21 and 23 each have an inner ring 33, 35 resting on bearing neck 37 of cutter head 5 the rings being disposed in recess 11.

Inner rings 33 and 35 are anchored between bearing shoulder 39 of cutter head 5 protruding beyond the circumferential surface of the bearing neck and an abutment 41 anchored to the circumferential surface of bearing neck 37, the abutment being disposed at a distance from bearing shoulder 39 and possibly being in the form of, for example, a spring lock washer or a ring nut. Between inner rings 33 and 35 is disposed a, preferably angular, spacer 43.

Between the inner and outer rings of angular ball bearings 21 and 23 is provided a number of balls 45 and 47. The inner and outer rings are designed so that cutter head 5 transmits the axial forces acting in the direction of body 3 via bearing shoulder 39, inner ring 33 of first angular ball bearing 21, spacer 43, inner ring 35 of second angular ball bearing 23 and via ball 47 of second angular bearing 23 to the outer ring 29 thereof and thus to bearing step 31. In other words, as seen in the axial direction, cutter head 5 is finally supported by bearing step 31 of body 3.

When tensile forces are exerted on cutter head 5, these forces act on abutment 41 which via inner ring 35 of the second angular ball bearing, spacer 43, inner ring 33 of first angular ball bearing 21 via ball 45 and outer ring 25 of the first angular ball bearing rests on bearing shoulder 17 of fixing plate 15. In other words, because fixing plate 15 is firmly connected with base element 9 of body 3 by means of screws 19, the axial forces are absorbed by body 3 in both directions via bearing arrangement 13.

In addition, here bearing neck 37 preferably has an extension 49 which is concentric with bearing neck 37 and optionally has a smaller diameter than the bearing neck. By mean of an appropriate bearing, extension 29 is supported in the radial direction by base element 9, namely on the inner surface of recess 11, and prevents or reduces rocking movements of cutter 5 or of bearing neck 37 in recess 11 of body 3. Preferably, a grooved ball bearing 51 is provided here which with its outer ring 53 rests on the inner surface of recess 11 and with its inner ring 55 on the circumferential surface of extension 49. Between outer and inner rings 33, 35 there is provided a number of balls 57.

In the aperture region of cutter head 5, fixing plate 15 is provided with an appropriate sealing system 59. Finally, there is provided a closing plate 61 which rests on fixing plate 15 and which in an appropriate manner, for example via screws 63, is attached to body 3, here to fixing plate 15.

It is essential that cutter head 5 be disposed eccentrically to middle axis 7 in body 3. Correspondingly, recess 11 is provided eccentrically in base element 9 of body 3. The apertures for cutter 5 in fixing plate 15 and closing plate 61 are also disposed eccentrically.

Otherwise, cutter head 5 is inclined toward middle axis 7 of body 3. This means that middle axis 65 of cutter head 5 forms with the middle axis 7 of body 3 an acute angle α, for example an angle of 1° 15". As seen from cutter head 5, this acute angle opens in the direction toward body 3. Recess 11 in base element 9 of body 3 is inclined correspondingly.

Cutter head 5 has a cutter collar 67 which comprises at least one cutter 69. When it is necessary to introduce into the surface of the bore only one groove, a single cutter 69 suffices. Preferably, however, several groves disposed at the same distance from one another are provided in a bore surface. Correspondingly, many cutters 69 must then be provided on cutter collar 67. Usually, they are disposed at the same distance from one another and stick out over the circumferential surface 71 of the cutter collar.

Preferably, cutter head 5 does not consist of a single piece. Rather, it has a tool shank 73 which at its end that rests within body 3 comprises bearing neck 37 and at its opposite end a fastening region 75 for a separately formed cutter collar 67. Fastening region 75, can, for example, be provided with a fastening pin to which cutter collar 67 is screwed on, inserted or fixed by means of a fastening screw 77. It is also conceivable to provide on cutter collar 67 a common clamping pin or clamping cone which engages with an appropriate recess in tool shank 73.

The two-part embodiment of cutter head 5 has the advantage that broaching tool 1 can be provided with different cutter collars 67. Moreover, in case of wear, cutter collar 67 can readily be replaced.

Here cutter head 5 is provided with a guiding arrangement 79 which can comprise a closed guide ring 81 or a guide ring 81 with individual guiding regions.

When, as in the case of broaching tool 1 shown in the drawing, cutter head 5 has a guide ring 81 with a crowned outer surface, its middle point 83 lies on the intersection of middle axis 65 of cutter head 5, which coincides with the middle axis of cutter collar 87, and the middle axis of guide ring 81 which coincides with middle axis 7 of body 3. Middle point 83 thus constitutes the tumbling point of broaching tool 1, to be discussed in more detail herein below.

If in a broaching tool 1 with a cutter head 5 the guiding arrangement 79 is omitted, the distance between cutter collar 67 and body 3 and the angle α between middle axis 65 of cutter head 5 and middle axis 7 of body 3 are to be selected so that middle point 84 of cutting collar 67 coincides with the intersection of middle axis 65 and middle axis 7. The tumbling point then lies to the left of middle point 83 shown in the drawing. In this manner, the tumbling point forms in the region of cutter collar 67 the middle point of cutters 69 on circumferential surface 71 and thus also of the circular path on which cutters 69 lie when cutter head 5 rotates.

As can be seen from the drawing, the broaching tool can be supplied with a coolant/lubricant. To this end, a central coolant/lubricant channel 85 that is concentric with middle axis 7 is provided in body 3. By means of a transfer tube 87 which is inclined toward middle axis 7, the coolant/lubricant is conducted in a coolant/lubricant channel 89 which is concentric with middle axis 65 of cutter head 5. Preferably, in coolant/lubricant channel 89 there is provided a supply tube 91 which is tightly connected with transfer tube 87 or forms a single piece with it.

Appropriate sealing measures make sure that the coolant/lubricant is transferred from the coolant/lubricant channel 85 to coolant/lubricant channel 89 without losses and that it cannot get to bearing arrangement 13. In particular, grooved ball bearing 51 is a sealed bearing.

It is indicated in FIG. 1 that coolant/lubricant channel 89 extends as far as fastening region 75 of cutter head 5 or of tool shank 73 and continues to cutter collar 67 via channels 93 that are inclined toward middle axis 65 of tool shank 73. As shown in the drawing, the outlet opening of channels 93 can be on the right side of cutter collar 67 if the bore surface of a blind hole is to be machined. The channels end on the left side of gear ring 67 if the bore surface of a through-bore is to be machined.

By means of the coolant/lubricant supply system, it is possible to bring a coolant/lubricant directly into the region of cutter collar 67, namely into the region in which in a work piece a bore surface is machined with at least one cutter 69, and at least one groove is formed.

If by means of broaching tool 1 a groove is to be made that extends parallel to the middle axis of the bore surface being machined, only one cutter 69 is needed, the cutting edge 94 of the cutter being directed forwards in the advancing direction and the leading surfaces 95, 95' thereof extending parallel to middle axis 65 of cutter head 5 or of cutter collar 67. In the practical example presented here, guiding surfaces 95, 95', are of course disposed at an angle toward middle axis 65. This angle determines the twist angle for the groove formed by the machining of a bore surface.

In other words, cutter edge 95 is essentially disposed on an imaginary cylindrical surface the middle axis of which coincides with middle axis 65 of the cutter head. On this cylindrical surface, however, the edge can also extend at an angle, as shown in the drawing.

In the following, the function of the broaching tool will be discussed in greater detail as will be the method for machining the surface of a bore, namely the making of a groove, with a geometrically defined cutter:

First, middle axis 7 of body 3 is disposed to be concentric with the middle axis of the bore surface to be machined. Body 3 rotates about its middle axis 7. In this manner, bearing neck 37 of cutter head 5 moves around on a conical surface the cone angle of which is 2α.

The apex of the imaginary cone coincides with the tumbling point and, in the practical example of broaching tool 1 shown in the drawing and which is provided with a guiding arrangement 79, with middle point 83.

If guiding arrangement 79 of broaching tool 1 is omitted, the apex of the imaginary cone coincides with middle point 84 of the circular path of at least one cutter 69.

On the plane containing guide ring 81 of guiding arrangement 79 and on the plane containing front face 97 of cutter collar 67, middle axis 65 of cutter head 5 is disposed vertically. In this manner, the plane containing guide ring 81 or that containing front face 97 is inclined by an angle $\alpha$ toward middle axis 7 of body 3 and toward the middle axis of the bore surface to be machined.

During the rotation of body 3, front face 97 of cutter collar 67 undergoes a tumbling movement toward middle axis 7 so that cutter edge 64 of the at least one cutter 69 undergoes relative to the axial movement between body 3 and the work piece to be machined a superposed axial movement and little by little works itself into the bore surface to produce a groove in it. The groove then accommodates guiding surfaces 95, 95'. To prevent cutter 69 from seizing in the groove being made, guiding surfaces 95, 95' are preferably not parallel to each other; rather, a taper opposing the advancing movement is provided within the groove.

When, as shown in the drawing, guiding surfaces 95, 95' of the at least one cutter 69 are inclined at an angle toward middle axis 65 of cutter collar 67, at least one of the grooves formed extends on an imaginary screw line on the bore surface and in which cutter collar 67 is guided. In this case, cutter collar 67 is guided by guiding surfaces 95, 95' in the groove on the imaginary screw line so as to undergo a rotational movement along this groove. In the case of a 20° twist, cutter collar 67 also rotates by 20°.

In other words, in the machining of the surface of a bore, body 3 is made to rotate so that it turns about its middle axis 7. Cutter head 5 which is eccentrically positioned in body 3 then moves on an imaginary conical surface. When body 3 makes an advancing movement, axial forces can be transmitted from body 3 via bearing arrangement 13 to cutter head 5 and thus to cutter collar 67 so that cutter edge 64 of the least one cutter removes material from a region of the bore surface being machined thus creating at least one groove. The rotary movement of cutter collar 67 is passive meaning that cutter head 5 performs only a following movement. This movement can occur along a straight line or along a screw line. A torque, however, cannot be transmitted to cutter collar 67. Rather, the collar is guided into the groove created in the bore surface and—if guiding surfaces 95, 95' of the at least one cutter 69 are inclined—in accordance with the twist of the groove being formed.

It is particularly advantageous that body 3 is made to rotate by a machine tool as is commonly the case and rotates about its middle axis 7. A displacement of body 3 in the direction radial to middle axis 7 is not foreseen. Hence, no special programming or control is needed to be able to start up the machine tool. Otherwise, it can be seen that broaching tool 1 is of relatively simple design. Hence, it can be produced at a low cost and is not likely to cause problems.

Otherwise, it is very easy to insert cutter head 5 into the bore to be machined, because either guide ring 81 or—in the case of a broaching tool without guiding arrangement 79—front face 97 of cutter collar 67 is concentric with middle axis 7 of body 3. The machining of the surface of a bore is particularly simple when guiding arrangement 79 is provided with guide ring 81, because in that case broaching tool 1 can be inserted somewhat into the bore to be machined until the at least one cutter 69, disposed at an axial distance as seen in the direction of middle axis 65, engages the bore surface.

It is also advantageous, despite the eccentric positioning of cutter head 5 in body 3, to be able to provide a supply of coolant/lubricant that ends in the region of cutter collar 67 and can be designed so that blind holes as well as through-bores can be machined to produce at least one groove.

The invention claimed is:

1. Broaching tool for machining bore surfaces namely for introducing at least one groove, with a cutter head having at least one cutter and with a body bearing the cutter head wherein the cutter head can undergo a rotary motion and is disposed eccentrically in the body and that the middle axis of the cutter head forms an acute angle $\alpha$ with the middle axis of the body.

2. Broaching tool as defined in claim 1, wherein the cutter head (5) comprises a tool shank which at its end is provided with a cutter collar and which with its other, opposite end is rotatably disposed in the body.

3. Broaching tool as defined in claim 1 wherein the cutter head is replacably disposed on the tool shank.

4. Broaching tool as defined in claim 1, wherein the at least one cutter lies on an imaginary circular path around the middle axis of the cutter head.

5. Broaching tool as defined in claim 1, wherein there are provided several cutters preferably disposed at a distance from one another—that lie on an imaginary circular path around the middle axis of the cutter head.

6. Broaching tool as defined in claim 1, wherein the at least one cutter has a guiding surface which is inclined at an angle toward the middle axis of the cutter head.

7. Broaching tool as defined in claim 1, wherein the cutter head has a guiding arrangement with a guiding section.

8. Broaching tool as defined in claim 4, wherein the middle point of the circular path of the at least one cutter or the middle point of the guiding section lies on the intersection of the middle axis of the body and the middle axis of the cutter head.

9. Broaching tool as defined in claim 1, wherein the tool shank is supported in the body by means of a bearing arrangement that absorbs radial and axial forces.

10. Broaching tool as defined in claim 9, wherein the bearing arrangement has at least one—and preferably two—angular ball bearings and a grooved ball bearing.

11. Broaching tool as defined in claim 1, further comprising a coolant/lubricant system for conducting a coolant/lubricant through the body and through the cutter head to the at least one cutter.

12. Method for machining the surface of a bore, namely for introducing at least one groove, by means of a cutter head provided with at least one cutter and by means of a broaching tool with a supporting body, particularly by means of a broaching tool as defined in claim 1, wherein the cutter head is introduced into the bore in a work piece that is to be machined, and during the rotary motion of the body and a relative axial movement between the broaching tool and the work piece brings about a tumbling movement and a following movement that is induced by the at least one groove formed in the bore surface.

* * * * *